United States Patent [19]

Noon et al.

[11] Patent Number: 5,052,773
[45] Date of Patent: Oct. 1, 1991

[54] ASSEMBLIES OF TUBE AND FIBER UNITS AND A UNIT POSITION CONTROL MEMBER

[75] Inventors: Laurence Noon; Royston Thornhill, both of Saskatoon, Canada

[73] Assignee: Northern Telecom Limited, Montreal, Canada

[21] Appl. No.: 538,309

[22] Filed: Jun. 14, 1990

[51] Int. Cl.⁵ .................................. G02B 6/36
[52] U.S. Cl. ........................... 385/136; 138/92; 138/108; 385/53; 385/109; 385/135
[58] Field of Search .............. 350/96.10, 96.20, 96.23, 350/96.24; 138/92, 94, 108, 111, 112, 177, 178; 174/40 CC

[56] References Cited

U.S. PATENT DOCUMENTS

| | | | |
|---|---|---|---|
| 1,365,613 | 1/1921 | Hiss | 174/40 CC |
| 4,212,097 | 7/1980 | Portinari et al. | 350/96.23 X |
| 4,359,262 | 11/1982 | Dolan | 350/96.20 |
| 4,585,036 | 4/1986 | Jartoux | 138/178 X |
| 4,630,886 | 12/1986 | Lauriello et al. | 350/96.20 |

*Primary Examiner*—John D. Lee
*Attorney, Agent, or Firm*—R. J. Austin

[57] ABSTRACT

In an optical fiber organizer, a wall of the organizer, which may be a removable shelf, has apertures for receiving tubes having optical fibers, the aperture having a lateral entry slot. The tubes are moved laterally along the slot, in succession so that the tubes progressively gather together in the aperture. The tubes are then brought together as a bundle by use of a tie wrap which is secured solely around the bundle. In the finished structure, the size of the bundle is too large to allow for its removal from the aperture along the slot.

4 Claims, 2 Drawing Sheets

ASSEMBLIES OF TUBE AND FIBER UNITS AND A UNIT POSITION CONTROL MEMBER

This invention relates to assemblies of tube and fiber units and unit position control members.

In the telecommunications industry, the use of optical cables having optical fibers housed within tubes (referred to herein as "tube and fiber units") is becoming increasingly of more commercial importance. Tube and fiber units may be included in an optical cable structure which, in use, has its jacket and any other tube surrounding material removed from an end portion of the cable to expose lengths of tube and fiber units which extend to tube and fiber storage or fiber connection locations. Alternatively, tube and fiber units are included as patchcords which do not form parts of a cable, but normally include a single fiber inside a tube with a connector at each end of the fiber for the purpose of interconnecting, by means of the patchcords, any optical connector of a bundle of connectors with any chosen optical connector of another bundle. Thus, transmission lines may be easily completed and changed when desired by rearranging the connections between the connectors of one bundle with those of the other.

In a conventional method of using tube and fiber units, the tubes are controlled in position for storage and for fiber connection purposes within a tube organizer in which the tubes are caused to follow predetermined paths so as to prevent them from having freedom of movement which could cause tube damage. Organizing of the tubes is also convenient as this enables ends of succeeding fibers to be aligned for connection purposes, for instance by fiber connectors or optical fiber splices. For the purpose of leading the tubes to a connector or organizing station, the tubes are held together as a bundle by the use of a tie wrap which extends around the bundle and is itself secured to a wall of part of the housing structure which provides the connector or organizing station. For convenience and assembly and maintenance, this part of the housing structure includes the connector or organizing station and is removable from the structure, perhaps as a slidable shelf. However, after removal of the removable part, it may be convenient to change its orientation relative to the remainder of the housing structure to permit work to proceed. This positional change will necessarily change the orientation of the tie wrap, because it is attached to the removable part, and hence results in twisting of the tube and fiber units. Damage may therefore result to the units and particularly to the fibers housed within the tubes.

The present invention seeks to provide an assembly of a bundle of tube and fiber units and a position control member for the units which, in use, minimizes the above problem. The invention also includes a method of making such an assembly.

According to one aspect of the present invention, there is provided an assembly of a bundle of tube and fiber units and a unit position control member wherein each tube and fiber unit comprises at least one optical fiber disposed within and extending along a tube and the position control member is formed with an aperture and a lateral entry slot extending to the aperture, the entry slot having a width less than that of the aperture, and the bundle of units having a width greater than the width of the slot and extending through the aperture, and a bundle retaining means is provided which extends around the bundle of tube and fiber units to retain the units together in the bundle as it extends through the aperture, the bundle retaining means being located in position solely by its mounting around the bundle of units.

With the use of the assembly according to the invention, should the position control member become changed in orientation in planes substantially normal to the axis of the aperture, then the position control member may rotate around the bundle of units without causing their rotation also. This is particularly the case where the bundle of units is disposed loosely through the aperture. Hence, movement of the position control member may be effected without placing undue strain on the tube and fiber units.

The invention also includes a method of forming an assembly of a bundle of tube and fiber units and a unit position control member comprising:- providing a unit position control member formed with an aperture and a lateral entry slot extending to the aperture, the entry slot having a width less than that of the aperture; providing a plurality of tube and fiber units, each unit comprising at least one optical fiber disposed within and extending along a tube; inserting the tube and fiber units, sequentially in a direction laterally of the axis of each unit, along the entry slot and into the aperture so that the units extend through the aperture from side-to-side of the control member, and progressively accumulating the units as a bundle extending through the aperture until the bundle has a width greater than the width of the slot; and then securing the units together as a bundle as it extends through the aperture by the use of a bundle retaining means which is located in position solely by being held around the bundle of units.

One embodiment of the invention will now be described, by way of example, with reference to the accompanying drawings, in which.

Figure 1:
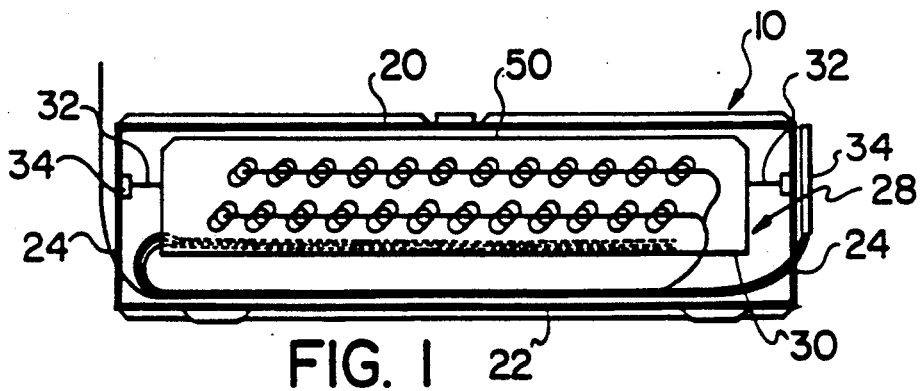
FIG. 1 is a front view of a tube and optical fiber unit organizer with a front cover of a housing structure removed.
Figure 2:
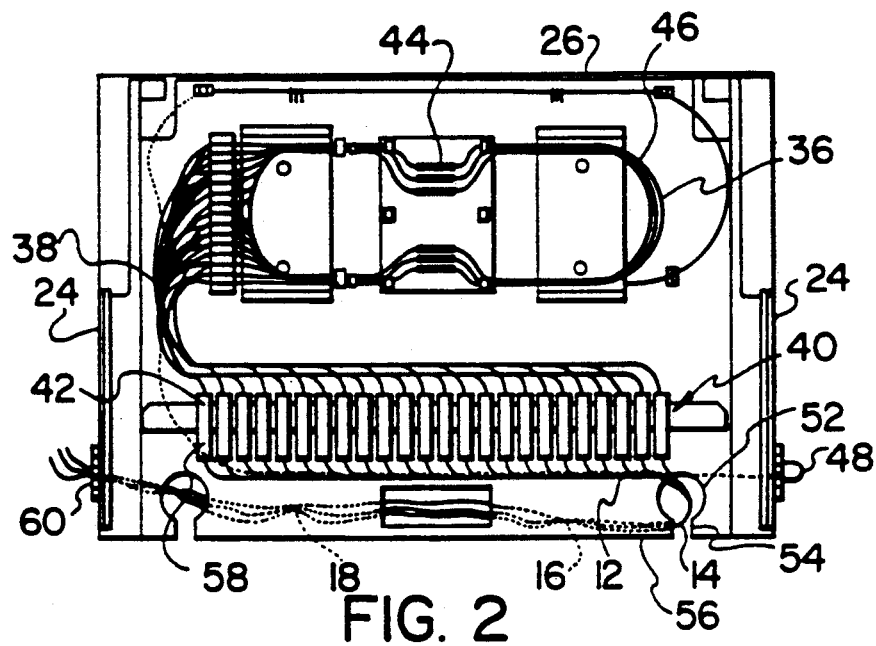
FIG. 2 is a plan view of the organizer with a top of the structure removed.

In the embodiment, as shown in FIGS. 1 and 2, generally there is an assembled tube and optical fiber unit organizer 10 and a plurality of tube and optical fiber units 12 held together in a bundle 14 by a bundle retaining means in the form of at least two tie wraps 16 and 18.

Figure 3:
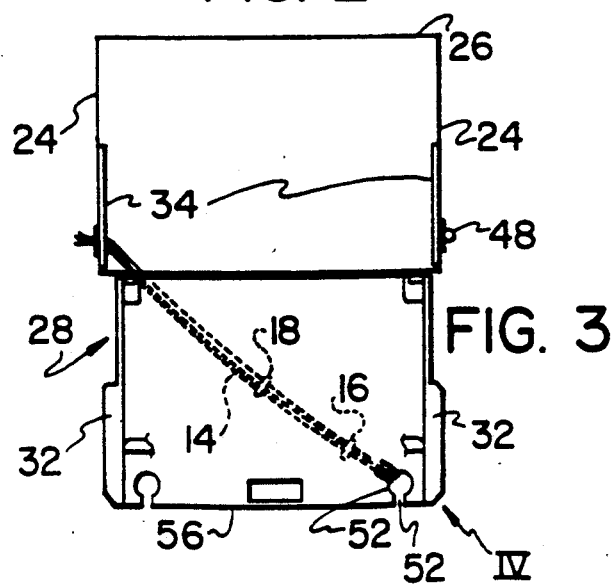
FIG. 3 is a plan view of the organizer with a removable shelf withdrawn from the housing structure.

More particularly, the unit organizer 10 comprises a housing structure having a top 20, bottom 22, sides 24, rear 26 and a front cover (not shown). The housing structure also comprises a removable shelf 28 which is disposable between the top and bottom of the structure and between the side walls 24. In its assembled position within the structure, the shelf 28 has a main planar portion 30 which lies substantially parallel with the top 20 and bottom 22. The shelf 28 is slidably removable from between the top, bottom and sides of the structure by sliding reception of flanged side edges 32 of the shelf within guide rails 34 mounted on the sides 24. The shelf 28 is removable from the front of the remainder of the structure as shown in FIG. 3, for maintenance and assembly purposes.

The main planar portion 30 of the shelf provides an organizing station 36 for pigtail fibers 38 which extend from a connector station 40. The pigtail fibers are of conventional construction and have connectors 42 at one end and are spliced by splices 44 at the other ends in the organizing station to further fibers 46 which pass through the housing structure from a cable 48 attached to one side 24 of the structure. Organizing station 36 which accommodates arcuate sections of the pigtail and other fibers as shown in FIG. 2, is of conventional construction and will be described no further. The connector station 40 is also of conventional structure and will be described no further apart from the fact the connectors 42 are arranged in the connector station 40 along two parallel horizontal rectilinear lines as shown in FIG. 1, upon a flange 50 mounted upon the main portion 30 of the shelf.

The shelf 28 comprises part of an assembly of the shelf and the bundle 14 of tube and optical fiber units 12. More particularly, in this assembly, the shelf is formed in its planar portion 30 with an aperture 52 which is spaced slightly behind the forward edge of the shelf in the assembled condition as shown in FIG. 2, and a lateral entry slot 54 to the aperture 52, the lateral entry slot extending from the aperture to a forward edge 56 of the shelf. As seen from FIG. 2, the entry slot 54 has a width which is less than that of the aperture. FIGS. 1 and 2, and 3 and 5 later to be referred to, are somewhat diagrammatic and while showing the paths followed by the tube and fiber units 12, give no indication of their thickness or diameter in relation to the size of the aperture 52 and entry slot 54.

Figure 4:
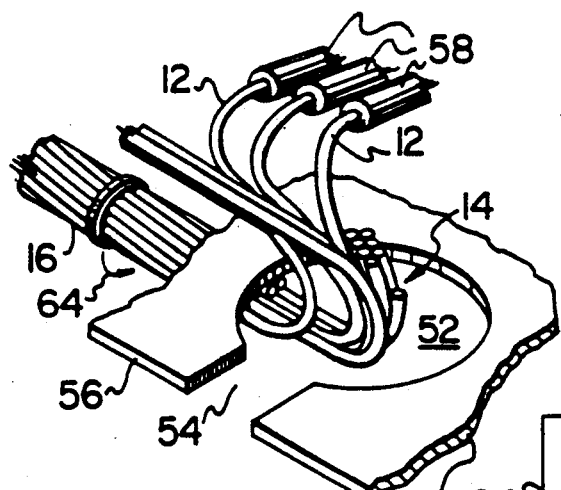
FIG. 4 is an isometric view, in the direction of arrow IV in FIG. 3 and to a larger scale than FIG. 3, of a part of an assembly of shelf and tube and fiber units in the shelf position of FIG. 3.

As may be seen more particularly from FIG. 4, the units 12 are of substantial outside diameter and as they extend from connectors 58 which are connected to connectors 42 at the connector station 40, the bundle 14 has substantial thickness. In fact as the bundle 14 passes through the aperture 52 as indicated by FIG. 4, the bundle has a width greater than that of the slot 54 whereby the bundle may not be removed through the slot. The bundle 14 of the units 12 is retained together as a bundle with a substantially circular section while passing through the aperture 52, by the tie wrap 16 which is disposed sufficiently closely to the aperture 52 for this purpose. The other tie wrap 18 is intended for the purpose of retaining the integrity of the bundle further from the aperture. It is important to note that the tie wrap 16 is not attached to any part of the housing structure, in particular it is not attached to the shelf 28, but is merely retained in position by its attachment to the bundle 14 of the units 12.

Each of the units 12 is, in this embodiment, a patchcord having a connector 58 at one end and another connector (not shown) at the other end, the tube and fiber units 12 of the patchcords extending beneath the shelf 28 and out from the housing structure through an outlet 60 in one side wall 24. Alternatively, the tube and fiber units 12 could form part of an optical cable (not shown) with the jacket and any sheath material surrounding the units removed to enable the units to be passed freely into the housing structure as shown in FIGS. 1 and 2.

Figure 5:
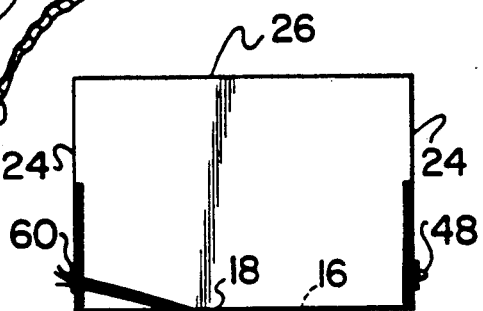
FIG. 5 is a view similar to FIG. 3 of the removed shelf rotated in its plane by an angle of 90°.
Figure 6:
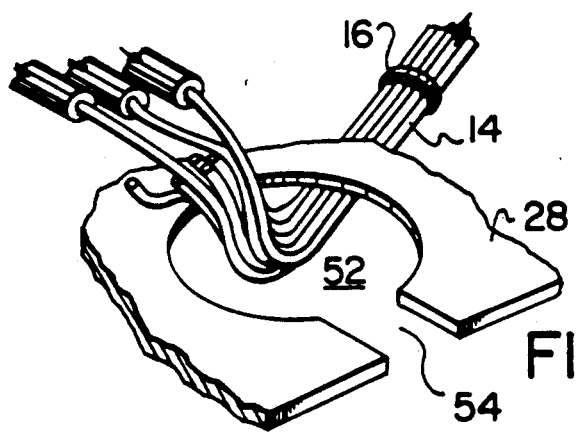
FIG. 6 is a view similar to FIG. 4 and taken in the direction of arrow VI in FIG. 5.

In the assembly shown in FIGS. 1 and 2, although this is not clear from those figures, the length of the bundle 14 of units 12 is sufficient within the structure 10 to enable the shelf 28 to be slid forwardly from the remainder of the housing structure so as to remove it for maintenance and assembly purposes as shown in FIG. 3. During this movement, as the bundle 14 of units 12 is not held in position to the shelf by the tie wraps 16 and 18, the bundle 14 is free to pivot within the aperture 52 as they extend towards the outlet 60 as shown in FIG. 3 and the tie wraps 16 and 18 move correspondingly with the bundle of units angularly around the aperture 52. Thus, as the shelf is removed, there is some rotational movement of the bundle of units as a whole within the aperture 52 to allow for its change of orientation as it extends to the outlet 60. Should it be required to change the orientation of the shelf for maintenance or modification purposes, then this places no undue strain or twisting of the units 12. For instance, as shown in FIGS. 5 and 6, the shelf 28 is rotated in its own plane approximately 90° relative to the position shown in FIG. 3. As the bundle 14 of the units 12 passes loosely through the aperture 52 then it is not caused by contact with the aperture to rotate with the shelf through the angle of movement of the shelf. Hence, the shelf rotates relative to the bundle 14 of the units with edges of the aperture 52 moving relative to each of the units 12 passing through the aperture.

As may be seen therefore from the above, with the bundle 14 of units passing, preferably loosely, through the aperture in the shelf and held as a bundle by the tie wrap which is not secured directly to the shelf then any rotational movement is not accompanied by a corresponding rotational movement of the units 12. Thus there is minimal stress and strain imposed upon the units. In addition, because the tie wraps 16 and 18 are not attached to the shelf, then the units 12 do not move together with the shelf.

To form the assembly of the shelf and the bundle 14, each of the units 12, before being included in the bundle 14, is fed individually into the slot laterally of the axis of the unit and into the aperture 52. This is indicated for one of the units 12a in FIG. 6 which is shown in full outline outside the aperture 52 and then, after movement in the direction of arrow 66, it is located in its final chain-dotted position 12b within the aperture. Thus the units are fed sequentially into the aperture so as to extend through the aperture from one side to the other. This action may be performed before or after the connectors 58 are connected to the connectors 42. After the units 12 are disposed within the aperture 52, the core wraps 16 and 18 and then applied around the unit 14 to complete the assembly. In the assembled condition, of course, the unit 14 cannot be removed as a unit from the aperture because its width is greater than that of the slot 54.

Figure 7:
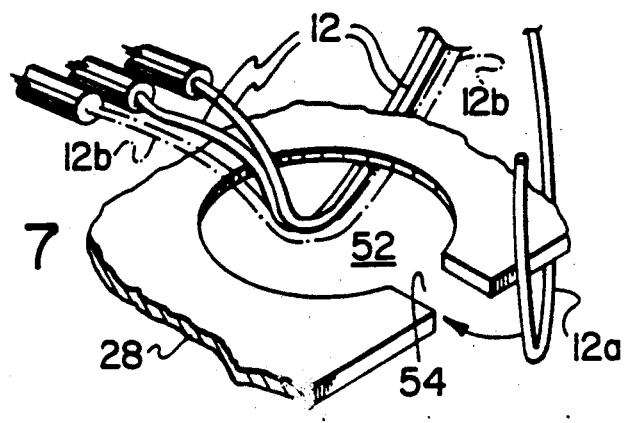
FIG. 7 is a view similar to FIG. 6 showing a stage in the forming of the assembly of shelf and tube and fiber units.

If the units 12 are assembled in the aperture 52 with the shelf 28 in the position of FIGS. 6 and 7, then as the shelf orientation is changed in position, for instance by 90° in the example shown by the embodiment, a slight twist of the units around the axis of bundle 14 may result. Such a twist may be for a quarter of a complete turn around the axis and would occur along the whole length of the bundle 14 up to the outlet 60. Thus no significant stress would be applied to any of the units 12. The twist is shown in exaggerated sense in FIG. 4 by arrow 64. It is interesting to note that the tie wrap 16 and possibly the tie wrap 18 may be rotated slightly with the twist of bundle 14, this rotation being made possible by virtue of the fact that both tie wraps are not secured directly to the shelf.

What is claimed is:

1. An assembly of a bundle of tube and fiber units and a unit position control member wherein each unit comprises at least one optical fiber disposed within and extending along a tube and the position control member is formed with an aperture and a lateral entry slot extending to the aperture, the entry slot having a width less than that of the aperture and the bundle of units having a width greater than the width of the slot and extending loosely through the aperture, and a tie wrap is provided which extends around the bundle of units and is localized along a short axial length of the bundle of units, said short axial length being sufficiently close to the aperture to retain the units together in the bundle as it extends through the aperture, the tie wrap being held in position solely by its mounting around the bundle of units and being moveable from around the bundle to enable the units to be removed sequentially, in a direction laterally of the axis of each unit, out of the aperture through the entry slot.

2. An assembly according to claim 1 wherein the position control member comprises a panel defining the aperture and with the lateral entry slot extending from an edge of the panel.

3. An assembly according to claim 1 wherein the tie wrap is spaced axially from the aperture along the bundle of units.

4. A method of forming an assembly of a bundle of tube and fiber units and a unit position control member comprising:

providing a unit position control member formed with an aperture and a lateral entry slot extending to the aperture, the entry slot having a width less than that of the aperture;

providing a plurality of tube and fiber units, each unit comprising at least one optical fiber disposed within and extending along a tube;

inserting the tube and fiber units sequentially and in a direction laterally of the axis of each unit, along the entry slot and into the aperture so that the units extend through the aperture from side-to-side of the control member, and progressively accumulating the units as a bundle extending through the aperture until the bundle has a width greater than the width of the slot;

and then securing the units together as a bundle as it extends through the aperture by the use of a bundle retaining means which is located in position solely by being held around the bundle of units.

* * * * *